April 18, 1933.  F. E. CHRISTOPHER  1,903,775
AIR SPRING AND CUSHION
Filed July 21, 1931  2 Sheets-Sheet 2

Inventor
Frank E. Christopher

By Brown & Phelps
Attorneys

Patented Apr. 18, 1933

1,903,775

UNITED STATES PATENT OFFICE

FRANK E. CHRISTOPHER, OF MORGANTOWN, WEST VIRGINIA

AIR SPRING AND CUSHION

Application filed July 21, 1931. Serial No. 552,264.

The invention relates to air springs and has as an object the provision of a device to store energy upon one stroke of a reciprocating element and return the energy to the element on the return stroke.

It is a further object of the invention to provide a device that will have a uniform spring action upon each stroke independent of any leakage.

It is a further object of the invention to provide a device that will not only store energy and return the same to the reciprocating element but will also cushion the said return stroke of the reciprocating element, thus greatly lessening the stresses and shocks upon the entire driving mechanism including the foundation thereof.

Further objects of the invention will appear from the following description when read in connection with the accompanying drawings showing an illustrative embodiment of the invention, and wherein:—

Figure 1:
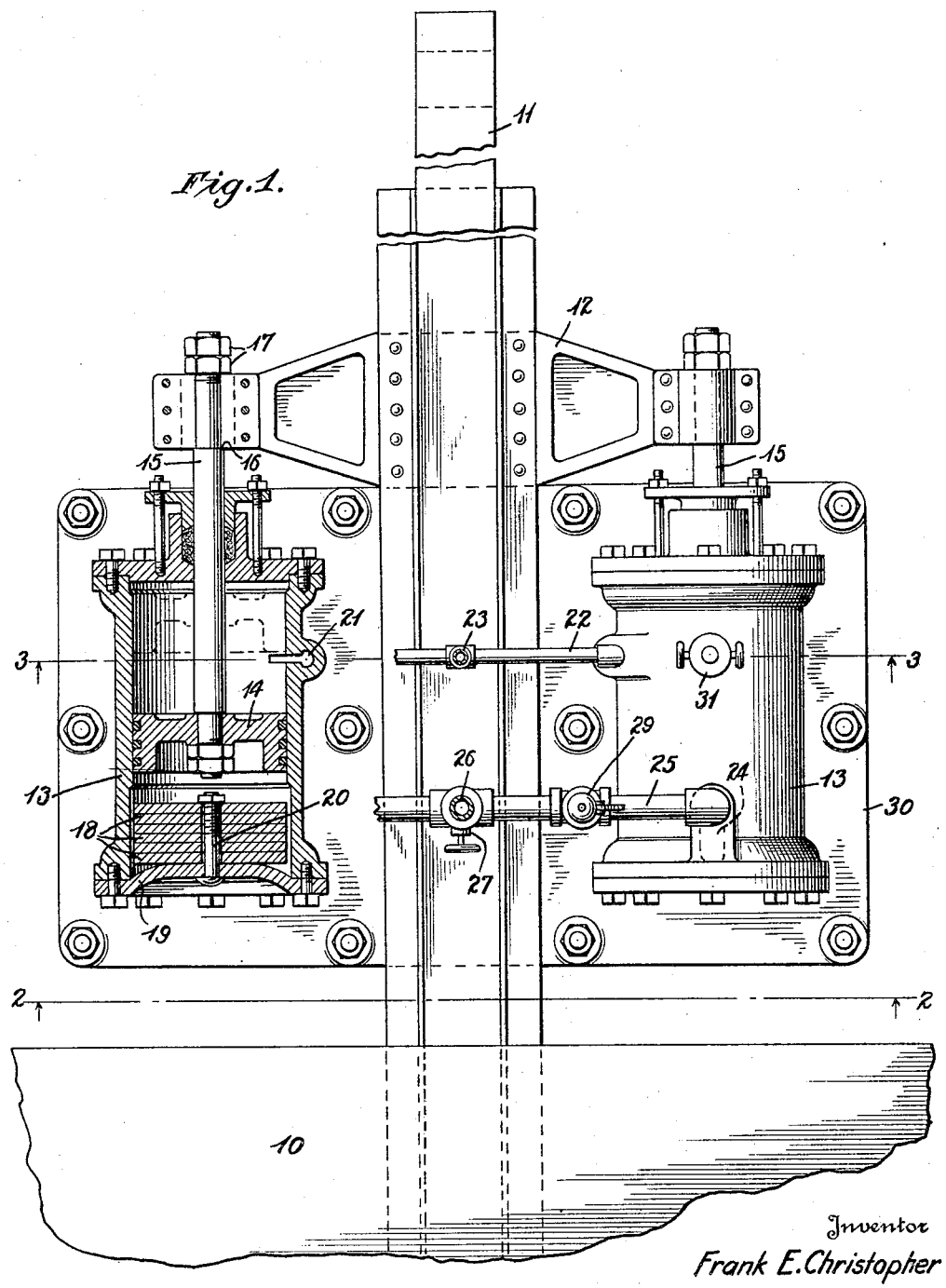
Fig. 1 is a plan view partly in horizontal section of an embodiment of the invention.

The invention as shown is particularly adapted for application to coal screens driven by the well known Marcus drive wherein the screen device is reciprocated slowly in the forward direction and returned quickly.

Devices of this character weigh many tons and an installation already made is reciprocated substantially 120 times per minute. Very great power is necessary to reverse the movement of the screen and to move it upon the return stroke at the speed of reciprocation indicated. Since sufficient power is required for the return stroke, much greater power must be available than is necessary for the slow forward motion. The application of the present invention to such a reciprocating device therefore stores up some of the excess power upon the slow stroke and returns the same to the device upon the quick stroke.

As shown a fragment of the coal screen structure is indicated at 10 to which power is applied by means of member 11 and the device of the invention is shown as secured to the connecting member 11 as by means of a yoke 12.

For purposes of balanced reactions, the invention includes the application of duplicate apparatus, one being placed each side of the member 11, the yoke 12 extending in opposite directions from said member.

The device as shown comprises duplicate cylinders 13 in which pistons 14 are moved by means of piston rods 15 connected to the yoke, as by a shoulder 16, against which the yoke is pressed by means of lock nuts 17. The amount of compression of air in the cylinders caused by inward movement of the piston 14 may be roughly adjusted by varying the member of discs 18 secured to the head 19 of the cylinder by means of a bolt 20. The position of the piston 14 upon its return stroke is indicated in dotted lines in Fig. 1 and as shown opens a port 21 in the cylinder whereby the spring end of the cylinder is completely filled with air at each stroke independently of any leakage which may have taken place on the former spring action.

The ports 21 of the two cylinders are shown as connected by a pipe 22 which in turn has connected thereto a standpipe 23 preferably led to a position above the roof of the building in which the device operates so as to draw air into the device free from dust usually present in such locations.

When the pistons are moved toward the lower ends of the cylinder as seen in Fig. 1, the ports 21 are closed and the air is compressed in the cylinder which compressed air acts as a spring upon the return and quick stroke of the reciprocating member. At this time the port 21 is open to the spring in the cylinder above the piston and during the last portion of the stroke in this direction air is trapped in the cylinder above the piston and compressed to cushion the said return stroke.

Figure 2:
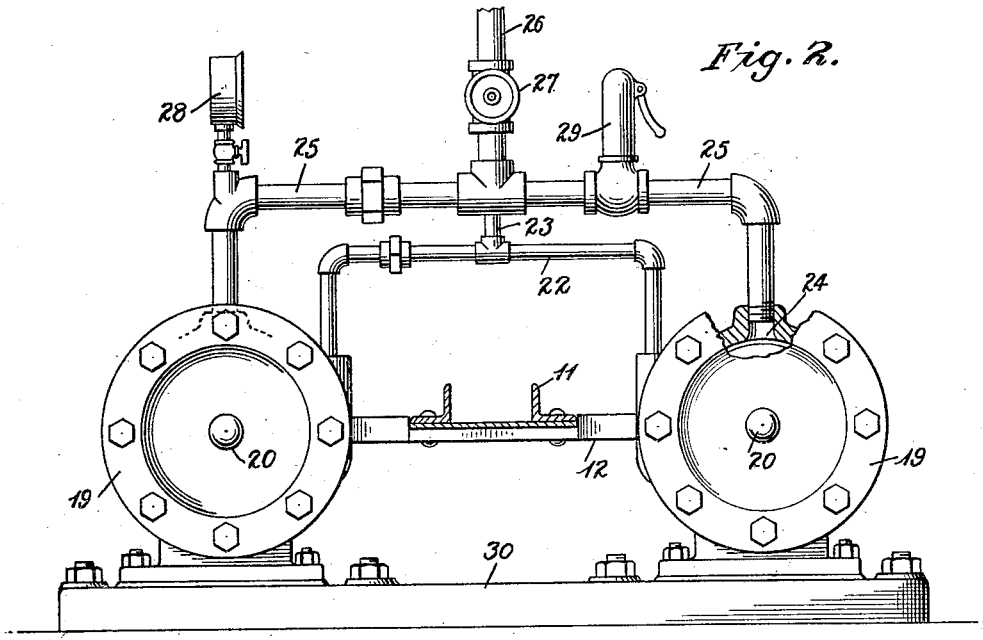
Fig. 2 is a section on line 2—2 of Fig. 1 showing the device in end elevation.
Figure 3:
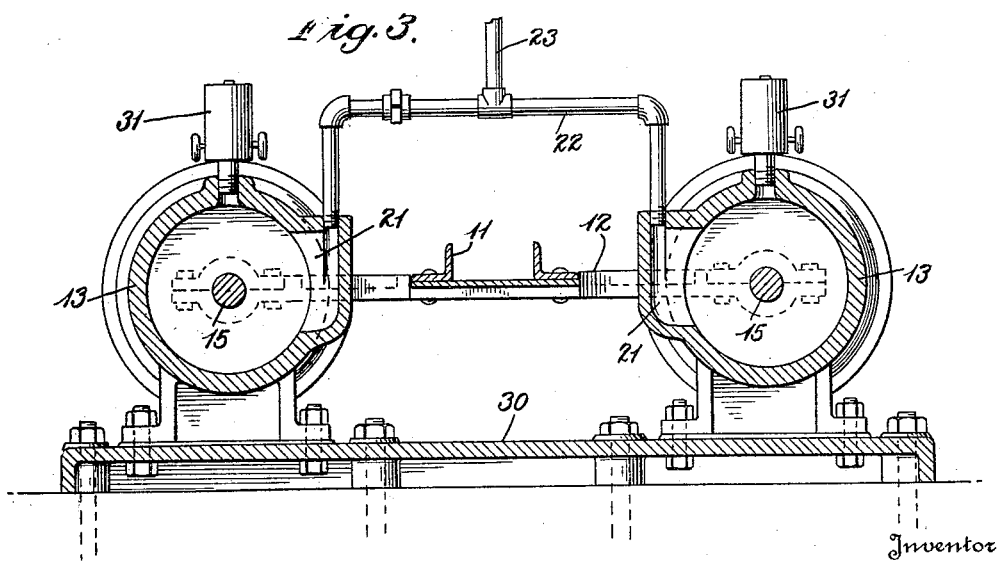
Fig. 3 is a vertical transverse section on line 3—3 of Fig. 1.

To provide a fine adjustment for the amount of compression, the spring ends of the cylinders are provided with ports as indicated at 24, Fig. 2, which ports are connected by a pipe 25, and a standpipe 26 is in communication with the pipe 25 at its intermediate portion equipped with a valve 27. By adjustment of the valve for leakage, the amount of compression of air upon the spring stroke may be adjusted. The pipe 25 is shown as equipped with a pressure valve 28 and with a safety valve 29 of the poppet type so that excess pressure may be relieved to prevent danger to the device.

Lubricators 31 are shown for the respective cylinders 13. The cylinders 13 are shown as mounted upon a base 30 which may be firmly bolted down so as to provide reaction against the spring action of the device as it applies its power to the reciprocating member.

When the device is installed the amount of compression caused by reciprocation of the screen is roughly adjusted by placing more or fewer discs 11 upon the bolt 20, after which the compression may be adjusted by means of a valve 27.

The connection 25 between the pistons ensures that equal pressures will exist at all times in the two pistons 13 so as to provide an even force upon the two ends of yoke 12.

Application of the device of the invention to the drive mechanism of a coal screen greatly reduces the former extreme stress and shock upon the whole structure including the foundations and eliminates the need formerly existing of greatly oversize shafting and connections.

Minor changes may be made in the physical embodiment of the invention within the scope of the appended claims without departing from the spirit thereof.

I claim:

1. An air spring comprising, in combination, a structure to be reciprocated at different speeds in alternate directions, a reciprocating member secured to said structure, a cylinder closed at one end and having a port opening to the atmosphere at a point distant from said end, a piston reciprocable in said cylinder to uncover said port upon recoil from said closed end, means to connect said piston to said reciprocating member and means to vary the clearance of the piston from said closed end.

2. An air spring comprising, in combination, a structure to be reciprocated at different speeds in alternate directions, a reciprocating member secured to said structure, a cylinder closed at one end and having a port opening to the atmosphere at a point distant from said end, a piston reciprocable in said cylinder to uncover said port upon recoil from said closed end, means to connect said piston to said reciprocating member and means to vary the clearance of the piston from said closed end comprising removable disc means retained in said cylinder.

3. An air spring comprising, in combination, a structure to be reciprocated at different speeds in alternate directions, a reciprocable member secured to said structure, a pair of cylinders each having a closed end, a piston operable in each of said cylinders, a piston rod connected to each piston and yoked to said member, movement of said pistons in one direction adapted to compress air in said cylinders, and means placing the compression spaces of said cylinders in communication whereby to equalize pressures therein.

4. An air spring comprising, in combination, a structure to be reciprocated at different speeds in alternate directions, a reciprocable member secured to said structure, a pair of cylinders each having a closed end, a piston operable in each of said cylinders, a piston rod connected to each piston and yoked to said member, movement of said pistons in one direction adapted to compress air in said cylinders, a conduit in communication with the compression space of each of said cylinders, a vent in said conduit, and means to control said vent whereby pressures in said spaces may be adjusted.

5. An air spring comprising, in combination, a structure to be reciprocated at different speeds in alternate directions, a reciprocable member secured to said structure, a pair of cylinders, a piston operable in each of said cylinders, each cylinder having a port adjacent and spaced from one end thereof, closure means for each end of said cylinders, said pistons uncovering said port by its movement in each direction and providing a spring action in one direction and a cushion action in the opposite direction, a piston rod connected to each piston and slidable through the closure of one end of each cylinder, and yoke means connecting said rods and member.

6. An air spring comprising, in combination, a structure to be reciprocated at different speeds in alternate directions, a reciprocable member secured to said structure, a pair of cylinders, a piston operable in each of said cylinders, each cylinder having a port adjacent and spaced from one end thereof, closure means for each end of said cylinders, said pistons uncovering said port by its movement in each direction and providing a spring action in one direction, a conduit connected to said ports and having a branch extending to a position of substantially dust-free atmosphere.

FRANK E. CHRISTOPHER.